(12) United States Patent
Lehnert

(10) Patent No.: US 7,751,509 B1
(45) Date of Patent: Jul. 6, 2010

(54) METHOD FOR MULTIPLE-ACCESS INTERFERENCE SUPPRESSION FOR MC-CDMA BY FREQUENCY DOMAIN OVERSAMPLING

(75) Inventor: James S. Lehnert, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 794 days.

(21) Appl. No.: 10/959,900

(22) Filed: Oct. 6, 2004

Related U.S. Application Data

(60) Provisional application No. 60/509,083, filed on Oct. 6, 2003.

(51) Int. Cl.
*H04B 1/10* (2006.01)
(52) U.S. Cl. .................. 375/346; 375/260; 375/262; 375/316; 375/284; 375/285; 375/347; 375/348; 375/349; 375/350; 375/351
(58) Field of Classification Search .................. 375/260, 375/262, 316, 284, 285, 346–351
See application file for complete search history.

(56) References Cited

U.S. PATENT DOCUMENTS

| | | | | | |
|---|---|---|---|---|---|
| 5,959,967 | A | * | 9/1999 | Humphrey et al. .......... | 370/208 |
| 6,288,674 | B1 | | 9/2001 | Sengupta et al. | |
| 6,404,760 | B1 | | 6/2002 | Holtzman et al. | |
| 6,654,408 | B1 | | 11/2003 | Kadous et al. | |
| 6,947,403 | B2 | * | 9/2005 | Heikkila et al. ............. | 370/335 |
| 7,023,265 | B1 | * | 4/2006 | Helard et al. ................ | 329/320 |
| 7,076,168 | B1 | * | 7/2006 | Shattil ......................... | 398/76 |
| 7,110,554 | B2 | * | 9/2006 | Brennan et al. ............ | 381/94.7 |
| 7,120,209 | B2 | | 10/2006 | Gorokhov et al. | |
| 7,133,352 | B1 | * | 11/2006 | Hadad ......................... | 370/208 |
| 2002/0044524 | A1 | * | 4/2002 | Laroia et al. ................ | 370/203 |
| 2004/0120274 | A1 | * | 6/2004 | Petre et al. .................. | 370/320 |
| 2005/0175112 | A1 | * | 8/2005 | Pisoni et al. ................ | 375/260 |

OTHER PUBLICATIONS

June Namgoong, Tan F. Wong, James S. Lehnert Multi-Access Interference Suppression for OFDM Systems based on Doppler Shifts 2002 IEEE 0-7803-7625-0/02.*

(Continued)

*Primary Examiner*—Chieh M Fan
*Assistant Examiner*—Siu M Lee
(74) *Attorney, Agent, or Firm*—William F. Bahret

(57) ABSTRACT

A technique for interference suppression in MC-CDMA systems is proposed which exploits the structural differences in signals that arrive at the receiver with Doppler shifts or carrier offsets. Oversampling the received signal in the frequency domain and properly combining the samples provides the interference suppression. Frequency domain oversampling is accomplished by using a time extension of the conventional MC-CDMA signal. Furthermore, a receiver structure is introduced that despreads and combines groups of samples so that a linear minimum mean-squared error solution for combining the groups is easily found. This combining scheme increases the signal-to-interference ratio (SIR) experienced by the desired user in the MC-CDMA system. In addition, the receiver performs well in severe near-far scenarios when there is sufficient Doppler separation between the signals of the desired user and an interferer. Numerical results show that the proposed receiver significantly outperforms the conventional MC-CDMA receiver.

14 Claims, 3 Drawing Sheets

OTHER PUBLICATIONS

June Namgoong, Tan F. Wong, James S. Lehnert, Multiple-Access Interference Suppression for OFDM system Based on Doppler Shifts, 2002.*

R. Nogueroles, M. Bossert, A. Donder and V. Zyablov, "Performance of a random OFDMA system for mobile communication", Feb. 17-19, 1998.*

Hwasun Yoo, Changeon Kang, and Daesik Hong, "Edge sidelobe suppressor schemes for uplink of orthogonal frequency division multiple access system", 2002.*

Juinn-Horng Deng, "An iterative maximum SINR receiver for multicarrier CDMA systems over a multipath fading channel with frequency offset", May 2003.*

T. F. Wong et al., "A Linear Receiver for Direct-Sequence Spread-Spectrum Multiple-Access Systems with Antenna Arrays and Blind Adaptation," *IEEE Transactions on Information Theory*, vol. 44, No. 2, Mar. 1998, pp. 659-676.

T. F. Wong et al., "Asynchronous Multiple-Access Interference Suppression and chip Waveform Selection with Aperiodic Random Sequences," *IEEE Transactions on Communications*, vol. 47, No. 1, Jan. 1999, pp. 103-114.

June Namgoong, "Multicarrier Spread-Spectrum Systems for Multiple-Access Communications," Ph.D. Thesis, Purdue Unversity, Aug. 2002, 94 pages.

J. Namgoong et al., "Multiple-Access Interference Suppression for OFDM Systems Based on Doppler Shifts," *MILCOM 2002—IEEE Military Communications Conference*, vol. 21, No. 1, Oct. 7, 2002, pp. 567-571.

S. Bhashyam, A. M. Sayeed and B. Aazhang, "Time-selective signaling and reception for communication over multipath fading channels," *IEEE Trans. Commun.*, vol. 48, No. 1, Jan. 2000, pp. 83-94.

S. Beheshti, G. Wornell, S. Isabelle, "Joint intersymbol and multiple-access interference suppression algorithms for CDMA systems," *European Transactions on Telecommunications*, vol. 9, No. 5, Sep./Oct. 1998, pp. 403-418.

R. Fantacci, D. Marabissi, S. Papini, "Multiuser Interference Cancellation for OFDM Systems with Frequency Offset", *Sixth Baiona Workshop on Signal Processing in Communications*, Sep. 2003.

* cited by examiner

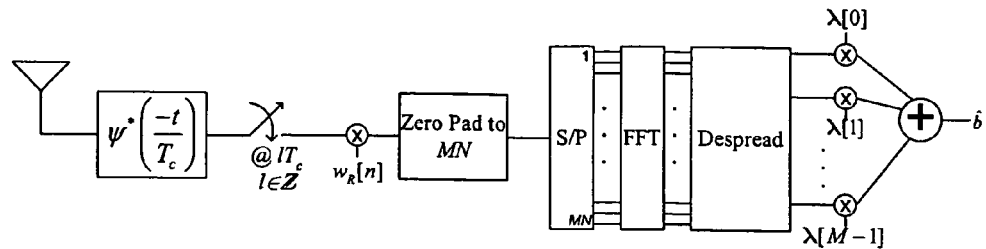
Fig. 1. The receiver model. The numbers in brackets are used to identify elements of vectors or sequences. The final decision statistic is $\hat{b}$ for detection of $b_1[0]$.
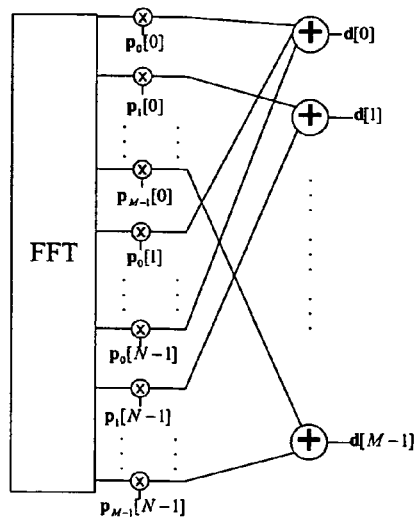
Fig. 2. This figure illustrates the operation of the despreader. Brackets are used to index elements of vectors (i.e. $p_0[0]$ is the first element of vector $p_0$).

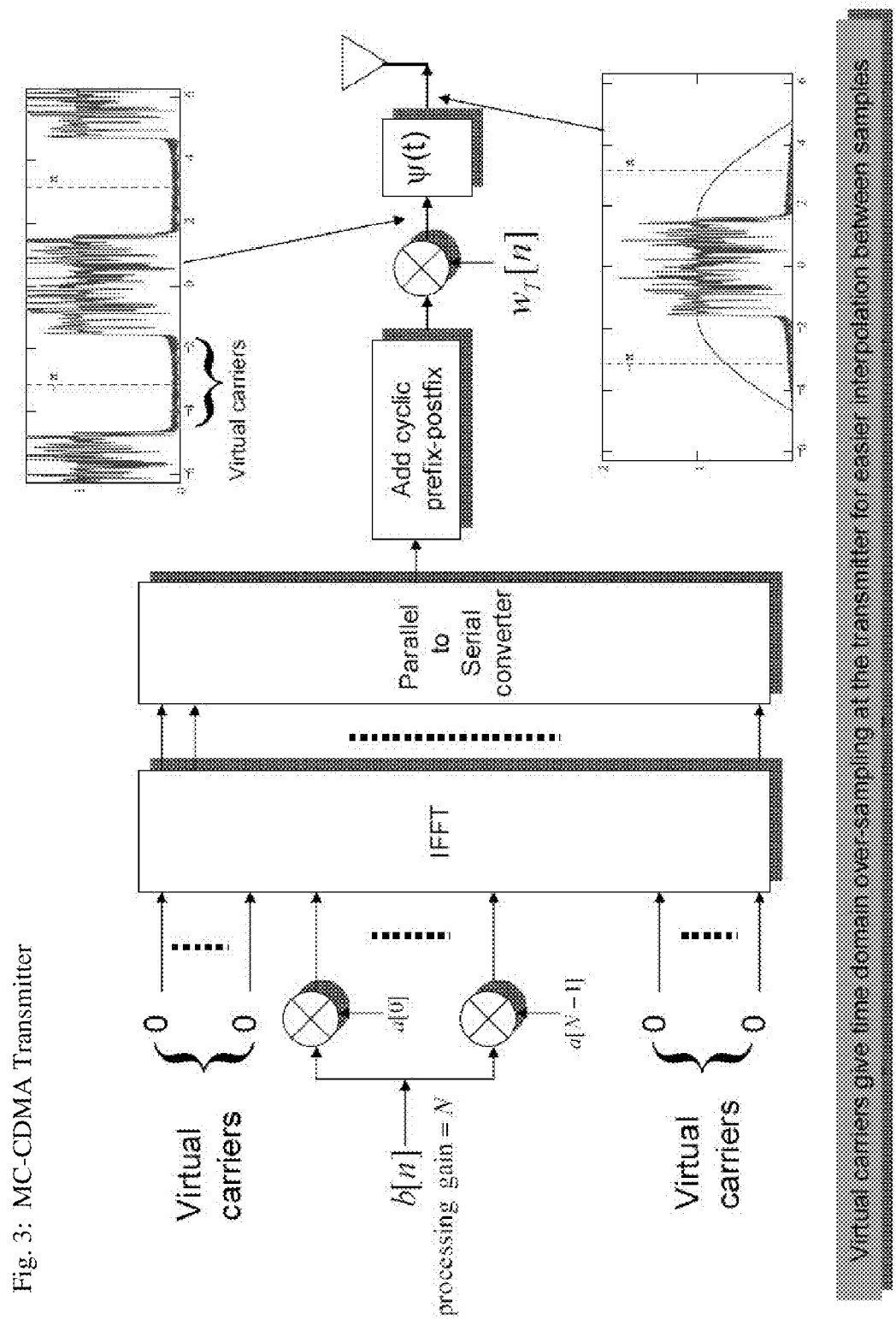

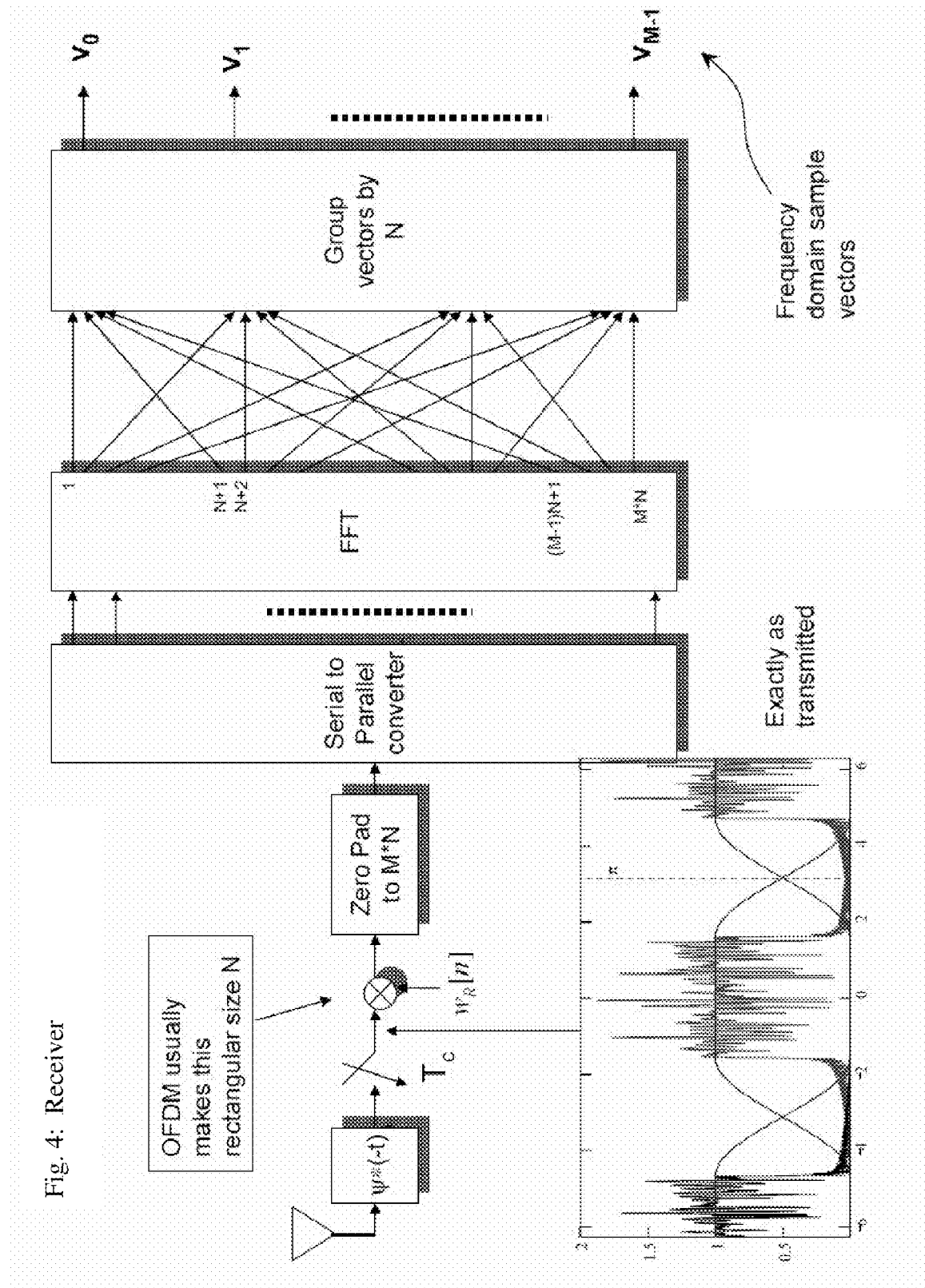
Fig. 4: Receiver

METHOD FOR MULTIPLE-ACCESS INTERFERENCE SUPPRESSION FOR MC-CDMA BY FREQUENCY DOMAIN OVERSAMPLING

CROSS-REFERENCE TO RELATED APPLICATION

This application claims the benefit of U.S. Provisional Patent Application Ser. No. 60/509,083, filed Oct. 6, 2003, which application is hereby incorporated by reference along with all references cited therein and all references cited herein. Also incorporated by reference is the Purdue University Ph.D. thesis by June Namgoong entitled "Multicarrier Spread-Spectrum Systems for Multiple-Access Communications."

I. BACKGROUND OF THE INVENTION

This invention relates to code-division multiple-access (CDMA) systems and, more particularly, to systems and methods for suppressing multiple-access interference (MAI) in CDMA systems. It also applies to systems with little or no spreading.

Recently, there has been significant interest in multicarrier and code-division multiple-access (CDMA) systems. Because efficient fast Fourier transform (FFT) techniques and high-speed digital signal processors are available, multicarrier systems are now being developed for high-data-rate communications. The convergence of multicarrier and CDMA systems is based on the application of spreading codes to orthogonal frequency division multiplexing (OFDM). The use of multicarrier code-division multiple access (MC-CDMA) was first proposed in [1] and [2], where spreading sequences are used in the frequency domain instead of the time domain. Since the appearance of [1] and [2], there has been significant work on improving the performance of these systems for different channel conditions. An overview and comparison of MC-CDMA techniques is given in [3].

In CDMA systems, multiple-access interference (MM) is one of the main sources of interference. Multiuser detection techniques can successfully reduce the effects of MAI, but they require substantial knowledge about the interfering signals and spreading sequences. This is especially true when the spreading sequences are aperiodic, because the optimal detector changes significantly from bit to bit [4]. Due to the complexity of multiuser detection algorithms, there has been research on excising interference using single-user detectors that exploit structural differences in the signals of different users. Techniques that have been successful in direct-sequence code-division multiple access (DS-CDMA) suppress MAI using limited knowledge about the interfering signals. Advantages provided by these techniques relative to multiuser detectors are lower complexity, lower requirements for system-wide knowledge, and possibilities for simple adaptive implementations. Since the symbol matched filter is the optimal receiver for the additive white Gaussian noise (AWGN) channel, the techniques for multiple-access interference suppression often focus on processing the output of the symbol matched filter. In [5], the authors over-sample the output of a symbol matched filter in the time domain and combine the samples to maximize several different performance metrics in a DS-CDMA system utilizing long pseudo-random spreading sequences.

Although interference suppression for DS-CDMA has been well studied, techniques for interference suppression in MC-CDMA have not been thoroughly explored. With increasing mobility of users and the desire to increase the processing gain in MC-CDMA systems, frequency shifts of users that result from Doppler or oscillator inaccuracies may soon become significant, and could even approach the sub-carrier frequency spacing.

II. SUMMARY OF THE INVENTION

Two figures illustrating certain aspects of the present invention are shown in Figures A and B. Large performance enhancements are possible if the structural differences of interfering users caused by frequency shifts at the receiver are exploited.

One embodiment of the present invention utilizes the interference suppression capability of a new MC-CDMA receiver that oversamples the received signal in the frequency domain by exploiting the unconsumed portion of the cyclic prefix, or by using a modified transmission scheme. The autocorrelation matrix of the received signal is computed. Next, the linear minimum mean-squared error (MMSE) solution for combining samples is found with an effective algorithm with low complexity.

The best results are obtained when there are significant differences in the signals received from different users. The results apply to an uplink MC-CDMA system, since pseudo-random codes have good cross-correlation properties and each user experiences a different channel. Advantages of the proposed receiver over receivers performing multiuser detection are lower complexity and fewer requirements for information about the interfering users' signals. If small changes to the transmitted signal are made, significant improvements in system performance can be achieved with minor increases in receiver complexity.

BRIEF DESCRIPTION OF THE DRAWINGS

FIG. 1 is a block diagram of a multi-carrier code division multiple access (MC-CDMA) receiver in accordance with the present invention.

FIG. 2 is a block diagram of the despreader of FIG. 1.

FIG. 3 is a block diagram of an MC-CDMA transmitter in accordance with the present invention.

FIG. 4 is a block diagram of an MC-CDMA receiver in accordance with the present invention.

III. DETAILED DESCRIPTION OF THE INVENTION

The principles of this invention have a number of applications, including applications to equipment that provides communications among aircraft, satellites, and missiles. Applications to equipment for land-based mobile communications are also contemplated. Cell phones, wireless access radios, global positioning system (GPS) receivers, and software programmable radios are examples of equipment in which the use of the invention is contemplated.

The description of the invention is organized as follows. In Section III-A, the structure of the transmitter is examined. Next, in Section III-B, the channel model is explained, and a receiver structure that maximizes the signal-to-interference ratio for a particular user is developed. Combining and detection methods are described in Section III-C.

A. Transmitter Model

The standard multicarrier transmitter is implemented with discrete Fourier transform (DFT) techniques. The transmitter is similar to an OFDM transmitter. However, in the MC- CDMA system, the same information symbol is sent on all subcarriers with different elements of the spreading sequence used on each subcarrier.

We assume a constant symbol time, T, and bandwidth, B. The spreading codes used for the MC-CDMA system are modeled as independent and identically distributed (i.i.d.) random variables in this discussion. The actual sequences may be m-sequences, Gold codes, or other sequences with pseudo-random properties. The kth user is assigned the spreading sequence $a_k[n]$ with $a_k[n]$ chosen from the set $\{+1, -1, +j, -j\}$ with equal probability. The kth user transmits the i.i.d. information sequence $b_k[n]$ with $b_k[n]$ chosen from the set $\{+1, -1\}$ with equal probability and independently of $a_k[n]$.

Because the spreading sequence is used in the frequency domain in an MC-CDMA system, it is convenient to define the time domain sequence associated with the frequency domain information symbol. The ith transmitted information symbol generates the time-domain sequence, $$d_k[n; i] = \frac{1}{\sqrt{N}} \sum_{m=0}^{N-1} b_k[i] a_k[iN+m] e^{j\frac{2\pi mn}{N}}. \quad (1)$$

Note that for fixed i, $d_k[n; i]$ is periodic in n with period N, where N is the processing gain. Thus, the frequency-domain representation of $d_k[n; i]$ is simply an impulse at each subcarrier, located at multiples of 1/N in the frequency domain, multiplied by the corresponding element of the spreading sequence and the ith information bit. Before transmission, the sequence $d_k[n; i]$ is windowed by $w_T[n]$ to limit the support of each symbol to P+L samples. Here, L samples are used as a cyclic prefix or guard interval for channel equalization at the receiver, and the value of L depends on the length of the channel response. The received signal contains $P=N+\alpha$ samples, where $\alpha$ is called the number of excess samples, which contribute to the decision statistic.

Notice that in this MC-CDMA system only N samples are needed to successfully despread the signal at the receiver because there are N subcarriers. A conventional OFDM-type receiver will discard the extra samples to restore orthogonality among subcarriers at the receiver [6]. We define $\alpha/N$ as the excess time because it is the ratio of the extra time that is not needed for despreading divided by the time needed for despreading[1]. In the description of this invention, we hold the length of the interval, P, constant for all systems we describe so that all use the same symbol time. To increase the processing gain of a system, the excess time is decreased, and vice versa. It is shown in the following that as excess time increases, processing gain decreases, but gains at the receiver are still realized because using the excess time results in beneficial structure of the interfering signals.

[1]The excess time in MC-CDMA has a role similar to excess bandwidth in DS-CDMA systems [7].

The multiplicative window, $w_T[n]$, used in the time domain to limit the support to one symbol, corresponds to convolution of the Fourier transform of $d_k[n; i]$ with the Fourier transform of $w_T[n]$. However, for fixed i, $d_k[n; i]$ corresponds to a sequence of impulses in the frequency domain. Hence, transmitter windowing can be interpreted as centering the Fourier transform of the window, given by $$W_T(f) = \frac{1}{\sqrt{P}} \sum_{n=-\infty}^{\infty} w_T[n] e^{-j2\pi nf} \quad (2)$$

at each subcarrier and multiplying by the appropriate element of the spreading sequence and the information symbol. With this framework, $W_T(f)$ can be viewed as the frequency-domain dual of the time-domain chip waveform in DS-CDMA.

The kth user transmits the complex baseband signal $s_k(t)$ given by $$s_k(t) = \sum_{i=-\infty}^{\infty} \sum_{l=-L}^{P-1} d_k[l; i] w_T[l] \psi\left(\frac{t - lT_c - iT}{T_c}\right) \quad (3)$$

where $T_c=T/(P+L)$ and $\psi(t/T_c)$ is a pulse shaping filter that satisfies the Nyquist criterion for zero inter-symbol interference (ISI) (e.g., square-root raised-cosine) when processed by a matched filter and sampled at $T_c$. In addition, $$\int_{-\infty}^{\infty} |\psi(t/T_c)|^2 dt = 1.$$

Since the pulses in (3) are generated at the rate $1/T_c$, the subcarriers are separated by $1/(NT_c)$ in the frequency domain upon transmission.

For clarity, we note that the structure of the transmitted signals can be modified slightly to allow for virtual carriers, as described in [8], by setting several subcarriers to zero before taking the inverse discrete Fourier transform (IDFT) of the spreading sequence, as shown in (1). In this case, the total number of subcarriers (active and virtual) is still N, although the actual processing gain is the number of active subcarriers. However, since virtual carriers lead to notational complexity, we assume for the remainder of the paper that no virtual carriers are used. In addition, the subcarrier separation can be decreased and a high data rate can still be maintained if subsets of the subcarriers are used for different bits, as is done in [9]. This is desirable because smaller subcarrier spacing implies that less frequency offset is needed to take advantage of the structural differences in signals. Since this is a logical and simple extension, for clarity we now consider only one bit per multicarrier symbol.

B. Channel and Receiver Model

After transmission, each user's signal experiences a time delay and frequency shift as it propagates through the channel to the receiver. The impulse response of the channel for the kth user is given by $$h_k(t; \tau) = \sqrt{P_k} \sum_{i=1}^{L_c} h_{k,i} e^{j2\pi \Delta f_k(t-T_{k,i})} \delta(\tau - T_{k,i}) \quad (4)$$

where $T_{k,i}$, $\Delta f_k$, $h_{k,i}$, and $P_k$ are the time delay, carrier offset, path gain, and power gain experienced by the kth user in the ith channel path, respectively. This impulse response is constructed using the channel convention given in [10]. When $L_c=1$, this model adequately describes a system where users are mobile and experience Doppler shifts relative to other users. In addition, if $L_c \geq 1$ it is useful for modeling wireless local area networks, where users may have oscillator differences and experience multipath fading. If there are a total of K simultaneous transmitters, the received signal is given by $$r(t) = \sum_{k=1}^{K} \sqrt{P_k} \sum_{i=1}^{L_c} h_{k,i} s_k(t - T_{k,i}) e^{j2\pi \Delta f_k (t - T_{k,i})} + n(t) \quad (5)$$

where n(t) is a complex AWGN process with i.i.d. real and imaginary parts, each with power spectral density $N_0/2$.

Without loss of generality, in the remainder of the description we assume that the receiver detects the information transmitted by the first user. All other signals are considered interference. We also assume that the receiver can accurately track the channel response of the desired user so we can set $T_{1,1}=0$ and $\Delta f_1 = 0$ without loss of generality. Furthermore, we make the assumption that the system is quasi-synchronous, as described in [3]. This ensures that the signal is analyzed over a single symbol interval for all users. With this assumption, the receiver can demodulate the signals of all users by taking one FFT after sampling, thereby, decreasing complexity. The cyclic prefix, L, can be chosen based on the delay spread of the channel and the amount of timing ambiguity allowed by the quasi-synchronous assumption. The cyclic prefix length is chosen so that $LT_c > \max(T_{k,i}) + \Delta T$, where $\Delta T$ is the timing ambiguity allowed by the quasi-synchronous timing system.

FIG. 1 depicts the receiver structure. We proceed by describing the received signal at each block in the receiver. First, the received signal is filtered by the matched filter to the transmitted pulse, which has impulse response given by $\psi^*(-t/T_c)$, where the superscript * represents complex conjugation. We assume that the frequency shift experienced by any user is small when compared to the total bandwidth occupied by the transmitted signal. In this case the effect of the frequency shift on each user's signal is negligible as it is filtered by $\psi^*(-t/T_c)$. If virtual carriers are used at the transmitter, the effect is even smaller because the active subcarriers are all in the flat part of the spectrum of $\psi(t/T_c)$ [8].

After filtering, the signal is sampled at time intervals of $T_c$. The frequency domain aliasing that is induced by sampling is not detrimental because $\psi(t)$ was chosen to satisfy the Nyquist zero-ISI condition. The sampled sequence is denoted by r[n]. The received signal is sampled P+L times over one symbol period of the first user, and the last P samples are used to detect the information.

After sampling the filtered signal, the samples are windowed so that only samples associated with one symbol remain. The receiver window, denoted by $w_R[n]$, has support over P samples, and has a spectrum given by $$W_R(f) = \frac{1}{\sqrt{P}} \sum_{n=-\infty}^{\infty} w_R[n] e^{-j2\pi nf}. \quad (6)$$

To maintain orthogonality among subcarriers, conventional systems use a rectangular window of length N. However, it is shown in [11] that using excess samples can provide useful information for demodulation and detection in OFDM systems. Furthermore, longer windows that satisfy a dual version of the Nyquist condition for zero ISI can be chosen to maintain zero inter-carrier interference (ICI) at the receiver. We note that the need for zero-ICI is not as important in MC-CDMA systems as it is in OFDM systems because the subcarriers in MC-CDMA are all modulated by the same information symbol. Therefore, in an MC-CDMA system, compensation can be made for a window that induces ICI at the receiver because the relationship between subcarriers is completely specified by knowledge of the desired user's spreading sequence and the windows used at the transmitter and receiver.

The combined effect of the windows at the transmitter and receiver is that the spectrum of the received signal is a linear combination of shifted versions of their combined frequency response given by $$W(f) = W_T(f) * W_R(f) \quad (7)$$

where * represents periodic convolution as described in [12]. This is because the transmitter sends the periodic discrete-time sequence described in (1), which is then multiplied by both $w_T[n]$ and $w_R[n]$. Hence, a convolution in the frequency domain results. The desired user's part of the received signal spectrum after receiver windowing is $b_1[i]H_1(f)G_1(f; i)$, where $$G_1(f; i) = \sum_{n=0}^{N-1} a_1[n + iN] W(f - n/N) \quad (8)$$

is the desired user's spectrum and H(f) is the transfer function of the channel. For the desired user we can write $$H_1(f) = \quad (9)$$

$$\frac{1}{T_c} \sum_{k=-\infty}^{\infty} \int_{-\infty}^{\infty} e^{-j2\pi(f - k/T_c)\tau} \int_{-\infty}^{\infty} e^{-j2\pi(f - k/T_c)\tau} \int_{-\infty}^{\infty} h_1(\alpha) \psi^*\left(\frac{\tau - \alpha}{T_c}\right) d\alpha d\tau$$

where $h_1(\cdot)$ only has one argument because $\Delta f_1 = 0$.

After windowing, a discrete-time signal of length P results, which we analyze in the frequency domain. The discrete-time Fourier transform (DTFT) of the windowed signal corresponding to the ith information symbol is given by $$R(f; i) = \frac{1}{P} \sum_{k=0}^{P-1} r[k + i(P + L)] w_R[k] e^{-j2\pi fk}. \quad (10)$$

The spectrum is sampled by taking the FFT of the sequence $r[n+i(P+L)]w_R[n]$. In contrast to conventional multicarrier systems, the use of excess-time samples in this invention allows for sampling in the frequency domain at intervals closer than the carrier spacing. Hence, an FFT larger than N is computed. Since $r[n+i(P+L)]w_R[n]$ has support over P samples, a P-point FFT is sufficient to completely specify the spectrum of $r[n+i(P+L)]w_R[n]$. Nevertheless, for convenience and to aid understanding in this description, we zero pad $r[n+i(P+L)]w_R[n]$ so that the length of the FFT is a multiple of N. If we zero pad to M N samples, where M is an integer, there will be M N samples in the frequency domain. A subset of the samples correspond exactly to the frequencies of the subcarriers of the transmission.

We now describe the despreading technique. A conventional MC-CDMA receiver computes an FFT equal in length to the number of subcarriers and then despreads the frequency domain samples by multiplying each sample by the complex conjugate of the element of the spreading sequence that was modulated onto the corresponding subcarrier. This is described in [13]. However, in the invented receiver there are more samples than carriers, and some samples are not centered at the carrier frequencies. Despite this difference, each sample has a known value in an environment that is free of interference and noise, with the only ambiguity resulting from the multiplication by $b_1[i]$.

The received samples are despread with the sample value that is expected when the noise and interference are absent. This type despreading is a form of discrete matched filtering or maximal ratio combining. The samples of the received signal spectrum after computing a zero-padded FFT are $R(k/M N; i)$, for $k=0, 1, \ldots, M N-1$. Hence, the samples can be despread by multiplying the kth sample by $H_1^*(k/M N)G_1^*(k/M N; i)$. In the next section, we describe a method used to combine these despread samples in order to make a decision about the polarity of $b_1[i]$.

The system can be described in vector form for convenience. We drop the symbol index, i, because the processing is over one symbol. Since there are M N samples in the frequency domain and there are N subcarriers, there are M samples between each subcarrier. The samples can be grouped into M groups of N samples for combining. This simplifies the problem of finding the optimal combining coefficients for all M N samples. We later establish that the reduction of the optimization problem to a smaller set of coefficients still provides significant MAI suppression. After the FFT in FIG. 1, a vector, $r_m$, can be formed for each group of N samples where the kth element of the mth vector is given by $$\{W_m^{(1)}\}_{j,k} = W\left((j-k+m/M)\frac{1}{N}\right)$$

for $k=0, 1, \ldots, N-1$ and for group indexes $m=0, 1, \ldots, M-1$. To represent (8) in matrix form in order to account for the effect of the transmitter and receiver windows, we define the N×N matrix $W_m^{(1)}$, where the superscript $(1)$ signifies that this matrix is associated with the first user and the subscript signifies that this matrix is used for the mth group of samples. The (j,k)th element of this matrix is given by $$\{W_m^{(1)}\}_{j,k} = W\left((j-k+m/M)\frac{1}{N}\right) \quad (12)$$

for $j=1, 2, \ldots, N; k=1, 2, \ldots, N;$ and $m=0, 1, \ldots, M-1$. Notice that $W_m^{(1)}$ is simply a Toeplitz matrix that shows how to combine components of the spreading sequence to determine what value a sample in the frequency domain would have in an interference-free environment. We let $a_i$ be an N dimensional vector of the spreading sequence used for the current information symbol transmitted by user 1 and let $H_m^{(1)}$ be an N×N diagonal matrix that specifies the channel effects. The diagonal elements of $H_m^{(1)}$ are given by $$\{H_m^{(1)}\}_{i,i} = H_1\left(\frac{(i-1)+m/M}{N}\right) \quad (13)$$

with $i=1, 2, \ldots, N$ and $m=0, 1, \ldots, M-1$. The despreading vector is defined as $p_m = H_m^{(1)} W_m^{(1)} a_i$. The vector $p_m$ contains N despreading values in the frequency domain. The values correspond to frequencies separated by $1/N$ with the first element corresponding to the frequency $f=m/(MN)$. The despreading operation is shown in FIG. 2. The samples contained in $r_m$ are despread and combined according to the equation $$d_m = p_m^H r_m. \quad (14)$$

Here, the superscript $^H$ stands for the Hermitian transpose. In (14), $d_m$ can be viewed as a decision statistic generated by the mth group of samples, since it is negative if $b_1$ is negative and positive if $b_1$ is positive in an interference-free situation.

C. Combining and Detection

The M sample values from the group despreader are combined to make bit decisions. The linear MMSE combining criterion is chosen to maximize the SIR. The vector of combining coefficients is denoted by $\lambda$, and the goal is to minimize $E[|b_1-\lambda^H d|^2]$, where d is the vector containing the components $d_m$. To find the optimal choice of $\lambda$, the autocorrelation matrix of the received vector after despreading must be found to solve the Weiner-Hopf equations for the linear MMSE solution. The final decision statistic is $\hat{b}=\text{Re}\{\lambda^H d\}$, and the user's information symbol is decided based on the sign of this statistic.

D. Statistics of the Received Signal

The received vector, d, after despreading can be decomposed into three components, $$d=b_1 s+i+n \quad (15)$$

where $b_i s$ is the contribution of the desired user, i is the contribution of the interferers, and n is the contribution from white noise. Since these components are mutually uncorrelated, the autocorrelation matrix of d can be found from the individual autocorrelation matrices. The autocorrelation of d is given by $$R_d = R_s + R_i + R_n \quad (16)$$

where $R_s$ is the autocorrelation matrix of $b_1 s$, $R_i$ is the autocorrelation matrix of i, and $R_n$ is the autocorrelation matrix of n.

Since the contribution of the desired user to $d_m$ is $b_1 \|p_m\|^2$, where $\|\cdot\|$ is the Euclidean norm of the vector, the (j,k)th element of the autocorrelation matrix $R_s$ at the output of the despreader is given by $$\{R_s\}_{j,k} = E[P_1 \|p_j\|^2 \|p_k\|^2]. \quad (17)$$

To calculate the autocorrelation matrix of the interference terms, the structure of the components after the despreader in FIG. 1 must be determined. We focus first on the autocorrelation matrix of the white noise term. After the matched filter and sampler, there are P samples from filtered white noise with zero correlation between samples. Hence, the samples are i.i.d. complex Gaussian random variables with mean zero and variance $N_0/2$ per dimension. The real and imaginary parts are independent. The samples can be represented in the frequency domain as the DTFT of P i.i.d. Gaussian random variables times the window $w_R[n]$. The spectrum of these samples is given by $$Z(f) = \frac{1}{\sqrt{P}} \sum_{l=-\infty}^{\infty} n[l] w_R[l] e^{-j2\pi fl} \quad (18)$$

where the components n[l] are the white noise components after matched filtering and sampling.

Since a zero-padded FFT is used, there are MN samples of Z(f) to use for processing. The noise component on the mth branch of the despreader is $$n_m = p_m^H z_m \quad (19)$$

where the kth element of the mth vector is $$z_m[k] = Z\left(\frac{Mk+m}{MN}\right) \quad (20)$$

for k=0, 1, ..., N−1 and m=0, 1, ..., M−1. Finally, the autocorrelation matrix of n is given by $$R_n = E[nn^H] \quad (21)$$

where n is the vector of components $n_m$. A matrix form similar to (12) can be found for describing the noise components. In (18), n[l] is viewed as a signal with period P since $w_R[l]$ only has support over P samples. In this case, n[l] is discrete in frequency and the windowing can be interpreted as a convolution of the DTFT's of n[l] and $w_R[l]$. Since n[l] is modeled to have period P, the FFT can be used to find the spectrum. In this case, the FFT of n[l] leads to P frequency domain samples that are i.i.d. Gaussian random variables with zero mean and variance $N_0/2$ per dimension (assuming the FFT is normalized in power). The values of the frequency domain samples due to noise before the despreader can be found by using an N×N matrix $Q_m$ with the (p, q)th element given by $$\{Q_m\}_{p,q} = W_R\left(\frac{p}{N} - \frac{q}{P} + \frac{m}{M}\right) \quad (22)$$

for p=1, 2, ..., N; q=1, 2, ..., N; and m=0, 1, ..., M−1. This matrix is used to find the correlation of the white noise components. Note that, after the FFT, the noise samples are close enough in frequency that there can be correlation between samples. After despreading, the (p,q)th element of the noise autocorrelation matrix is given by $$\{R_n\}_{p,q} = tr(N_0 H_p^{(1)H} Q_p (H_q^{(1)H} Q_q)^H) \quad (23)$$

where tr(•) is the trace of the matrix.

The final task is to find the autocorrelation matrix of the multiple-access interference term after the despreader. It is assumed that the frequency shift of the interferer is negligible when compared with the bandwidth of $\psi(t/T_c)$. Hence, when the signal is sampled, the samples correspond to the subcarriers that the interferer transmitted shifted in frequency by $\Delta f_k$.

The DTFT of the kth user's signal for the ith bit is $b_k[i]H_k(f)G_k(f; i)$, where $G_k(f; i)$ is given by $$G_k(f; i) = \sqrt{P_k} \sum_{n=0}^{N-1} a_k[n+iN] W\left(f - \frac{n}{N} - \Delta f_k\right). \quad (24)$$

and $H_k(f)$ is defined as in (9), but for the kth user. To maintain the form described in (8) and (9), the frequency shift of the kth user is accounted for in the term $G_k(f; i)$ and the channel frequency selectivity is accounted for in the term $H_k(f)$. The frequency samples before the despreader can be evaluated with a matrix similar to $W_m^{(1)}$. We define $$\{W_m^{(k)}\}_{p,q} = W\left((p-q+m/M)\frac{1}{N} - \Delta f_k\right) \quad (25)$$

for p=1, 2, ..., N; q=1, 2, ..., N; and m=0, 1, ..., M−1. The spreading sequence for the ith symbol transmitted by user k is defined as the N dimensional vector, $a_k$. The interference term for the mth branch of the despreader is $$i[m] = \sum_{k=2}^{K} b_k \sqrt{P_k} \, p_m^H (H_m^{(k)} W_m^{(k)} a_k) \quad (26)$$

where m=0, 1, ..., M−1 indexes the branch coming out of the despreader. The autocorrelation matrix of i is given by $$\{R_i\}_{p,q} = \sum_{k=2}^{K} E[P_k p_p^H (H_p^{(k)} W_p^{(k)} a_k)(p_q^H (H_q^{(k)} W_q^{(k)} a_k))^*]. \quad (27)$$

After averaging, the (p,q)th element of the autocorrelation matrix for the multiple-access interference can be expressed as $$\{R_i\}_{p,q} \sum_{k=2}^{K} tr\left(P_k W_p^{(1)H} H_p^{(1)H} H_p^{(k)} W_p^{(k)} (W_q^{(k)H} H_q^{(k)H} H_q^{(1)} W_q^{(1)})^H\right). \quad (28)$$

1) MMSE Combining: To find the optimal combining vector, $\lambda_{opt}$, so that the decision statistic can be formed, the solution to $$\lambda_{opt} = \arg \min_{\lambda} E[|b_1 - \lambda^H d|^2] \quad (29)$$

is required. Since the autocorrelation matrix of the received vector after despreading is available, the optimal λ can be found using the Weiner-Hopf equations [14]. The optimal combining vector is given by $$\lambda_{opt} = R_d^{-1} s. \quad (30)$$

The SIR of the decision statistic with MMSE combining is given by $$SIR = \frac{|\lambda_{opt}^H s|^2}{\lambda_{opt}^H (R_n + R_i) \lambda_{opt}}. \quad (31)$$

A key figure of merit is the BER of the system. The Conditional Gaussian Approximation (CGA) [15] can be used to evaluate the BER of the system. Although [15] is focused on DS-CDMA, the results still hold for MC-CDMA. Similar results to those of [15] can be developed and applied in the frequency domain instead of the time domain. Since the output of the filter is approximately Gaussian for modestly high processing gains, conditioned on the carrier offset and channel state, we use the equation $$P_e(SIR) = Q(\sqrt{2SIR}) \quad (32)$$

to predict the error performance, where $$Q(x) = \int_x^\infty e^{-y^2/2} / \sqrt{2\pi} \, dy.$$

When this approximation holds, the maximization of the SIR is a good optimization criterion because the Q-function is a monotonically decreasing function.

E. Effects of Invention

With the invention there is a potential for significant multiple-access interference suppression in MC-CDMA systems when the users experience frequency shifts. These shifts can arise from Doppler or from oscillator inaccuracies in transmitters. If no excess time is used, all users are in the same subspace and nothing is gained from extra processing of the frequency domain data. However, if some excess time is used (or available from uncorrupted portions of the cyclic prefix), then any frequency shift can lead to an improvement in SIR that can be achieved by processing the extra samples in the frequency domain. Furthermore, the excess time information provides significant improvement in near-far situations, which is a very important scenario in CDMA systems with users that are highly mobile, or which may require different rates.

A new transmission scheme has been proposed that can lead to an interference suppression capability at the receiver. In addition, the MMSE combining solution has been developed for a simple despreading technique.

In published work and in technical discussions an assumption is often made that linear filtering is not very effective in reducing interference that exists in the same frequency band as the signal being received. After all, the linear filter results in a transfer function which passes both the interference and the signal. However, this argument, which applies to wide-sense stationary (WSS) interferences, is often misapplied to the situation in which interference arrives at a receiver with a fixed frequency relationship relative to the signal being demodulated. This invention exploits frequency relationships and offers a new approach to Doppler. It is more appropriate to model the interference as cyclostationary, rather than wide-sense stationary. Key timing and frequency relationships can remain nearly constant over several received data symbols. For example, in a multi-carrier CDMA spread-spectrum system, the signal from an interfering user might arrive at a receiver that is listening to the signal from another transmitter with a frequency relationship such that the frequency sub-band boundaries of the two signals are offset, perhaps by one half of the bandwidth of a sub-band. Algorithms that utilize this frequency relationship can provide great gains. Exploiting cyclostationary frequency relationships among the multiple users and interferences by the use of the present invention increases communications capacity and thereby enhances assured command, control, and communications. The invention offers a novel approach in which former problems, e.g., Doppler shifts, are used as beneficial structures of signals that allow interference excision.

REFERENCES

[1] N. Yee, J. P. M. G. Linnartz, and G. Fettweis, "Multi-carrier CDMA in indoor wireless networks," in *Proc. PIMRC'93*, September 1993, pp. 109-113.

[2] A. Chouly, A. Brajal, and S. Jourdan, "Orthogonal multi-carrier techniques applied to direct sequence spread spectrum CDMA systems," in *Proc. of GLOBECOM'93*, vol. 3, Houston, Tex., November 1993, pp. 1723-1728.

[3] A. C. McCormick and E. A. Al-Susa, "Multicarrier CDMA for future generation mobile communication," *Electronics and Communication Engneering Journal*, vol. 14, pp. 52-60, April 2002.

[4] S. Buzzi and H. V. Poor, "Channel estimation and multiuser detection in long-code DS/CDMA systems," *IEEE J. Select. Areas Commun.*, vol. 19, pp. 1476-1487, August 2001.

[5] T. F. Wong, T. M. Lok, J. S. Lehnert, and M. D. Zoltowski, "A linear receiver for direct-sequence spread-spectrum multiple-access systems with antenna arrays and blind adaptation," *IEEE Trans. Inform. Theory*, vol. 44, pp. 659-676, March 1998.

[6] B. Muquet, M. de Courville, P. Duhamel, and G. Giannakis, "OFDM with trailing zeros versus OFDM with cyclic prefix: Links, comparisons and application to the HIPERLAN/2 system," in *Proc. ICC 2000*, June 2000, pp. 1049-1053.

[7] J. H. Cho and J. S. Lehnert, "An optimal signal design for band-limited asynchronous DS-CDMA communications," *IEEE Trans. Inform. Theory*, vol. 48, pp. 1172-1185, May 2002.

[8] H. Sari, G. Karam, and I. Jeanclaude, "Transmission techniques for digital TV broadcasting," *IEEE Commun. Mag.*, vol. 33, pp. 100-109, February 1995.

[9] J. Namgoong, T. F. Wong, and J. S. Lehnert, "Multiple access interference suppression for OFDM systems based on Doppler shifts," in *Proc. of IEEE Military Communications Conf 2002*, Los Angeles, Calif., October 2002, pp. 567-571.

[10] S. Benedetto and E. Biglieri, *Principles of Digital Transmission, With Wireless Applications*. New York, N.Y.: Kluwer Academic/Plenum Pub., 1999.

[11] S. H. Müller-Weinfurtner, "Optimum Nyquist windowing in OFDM receivers," *IEEE Trans. Commun.*, vol. 49, pp. 417-420, March 2001.

[12] J. G. Proakis and D. G. Manolakis, *Digital Signal Processing: Principles, Algorithms, and Applications*, 3rd ed. Upper Saddle River, N.J.: Prentice Hall, 1995.

[13] R. v. Nee and R. Prasad, *OFDM for Wireless Multimedia Communications*. Boston, Mass.: Artech House, 2000.

[14] S. Haykin, *Adaptive Filter Theory*, 3rd ed. Upper Saddle River, N.J.: Prentice Hall, 1996.

[15] T. M. Lok and J. S. Lehnert, "An asymptotic analysis of DS/SSMA communication systems with random polyphase signature sequences," *IEEE Trans. Inform. Theory*, vol. 42, pp. 126-136, January 1996.

[16] T. F. Wong, T. M. Lok, and J. S. Lehnert, "Asynchronous multiple-access interference suppression and chip waveform selection with aperiodic random sequences," *IEEE Trans. Commun.*, vol. 47, pp. 103-114, January 1999.

[17] J. G. Proakis, *Digital Communications*, 3rd ed. New York, N.Y.: McGraw-Hill, 1995.

[18] A. V. Oppenheim and R. W. Schafer, *Discrete-Time Signal Processing*. Englewood Cliffs, N.J.: Prentice Hall, 1989.

What is claimed is:

1. A receiver for demodulating a transmitted signal consisting of data symbols modulated on multiple subcarriers at different frequencies in the presence of multiple-access interference (MAI), comprising:
    means for exploiting extra samples added to the transmitted signal by a transmitter and not required for despreading, and not used as a cyclic prefix of repeated samples that are discarded during channel equalization, in order to mitigate effects of multiple-access interference in the presence of Doppler, wherein said means for exploiting includes means for sampling at frequency intervals that are smaller than a spacing between subcarriers, and a window configured to selectively support said extra samples for interference excision;
    means for combining windowed samples with weighting coefficients to provide a decision statistic with the effects of multiple-access interference mitigated; and
    means for determining the data symbols from a sequence of decision statistics.

2. The receiver of claim 1, where the transmitted signal is modulated with modified multi-carrier code-division multiple-access (MC-CDMA) signaling.

3. The receiver of claim 1, where the transmitted signal is modulated with modified orthogonal frequency division multiplexing (OFDM) signaling.

4. The receiver of claim 1, further including adjustment of shape of a frequency pulse, that is, the distribution of the transmitted energy with frequency within the sub-bands corresponding to the sub-carriers.

5. The receiver of claim 1, further including means for estimating characteristics of the multiple-access interference and communication channel and adjusting the weighting coefficients to adapt to that interference.

6. The receiver of claim 1, wherein said receiver is configured to perform a windowing function matched to a transmitter windowing function which adjusts the shape of a subcarrier spectrum in an associated transmitter.

7. An MC-CDMA system for communicating data symbols modulated on multiple subcarriers at different frequencies in the presence of multiple-access interference (MAI), where various users occupy some of the same frequency subbands and are distinguished by code sequences, comprising:
    a transmitter having means for adding extra samples that are not required for despreading or for use as a cyclic prefix for multipath channel equalization at a receiver; and
    a receiver having
        means for exploiting said extra samples, added by said transmitter and not required for despreading or for use as a cyclic prefix for multipath channel equalization, in order to mitigate effects of multiple-access interference in the presence of Doppler, wherein said means for exploiting includes means for sampling at frequency intervals that are smaller than a spacing between subcarriers, and a window configured to selectively support said extra samples for interference excision;
        means for combining windowed samples with weighting coefficients to provide a decision statistic with the effects of multiple-access interference mitigated; and
        means for determining the data symbols from a sequence of decision statistics.

8. The MC-CDMA system of claim 7, wherein the transmitter transmits a signal that is modulated with modified multi-carrier code-division multiple-access (MC-CDMA) signaling, wherein the signaling is modified by increasing a normal transmission time for the transmitted signal.

9. The MC-CDMA system of claim 8, wherein said transmitter includes first windowing means for adjusting a shape of a subcarrier spectrum, and wherein said receiver includes second windowing means matched to said first windowing means.

10. An OFDM system for communicating data symbols modulated on multiple subcarriers at different frequencies in the presence of multiple-access interference (MAI), where various users occupy some of the same frequency subbands and are distinguished by code sequences, comprising:
    a transmitter having means for adding extra samples that are not required for despreading or for use as a cyclic prefix for multipath channel equalization at a receiver; and
    a receiver having
        means for exploiting said extra samples, added by said transmitter and not required for despreading or for use as a cyclic prefix for multipath channel equalization, in order to mitigate effects of multiple-access interference, wherein said means for exploiting includes means for sampling at frequency intervals that are smaller than a spacing between subcarriers, and a window configured to selectively support said extra samples for interference excision;
        means for combining windowed samples with weighting coefficients to provide a decision statistic with the effects of multiple-access interference mitigated; and
        means for determining the data symbols from a sequence of decision statistics.

11. The OFDM system of claim 10, wherein the transmitter transmits a signal that is modulated with modified orthogonal frequency division multiplexing (OFDM) signaling, wherein the signaling is modified by increasing a normal transmission time for the transmitted signal.

12. The OFDM system of claim 11, wherein said transmitter includes first windowing means for adjusting a shape of a subcarrier spectrum, and wherein said receiver includes second windowing means matched to said first windowing means.

13. A method of exploiting Doppler effects in communication of data symbols modulated on multiple subcarriers at different frequencies in the presence of multiple-access interference (MAI), where various users occupy some of the same frequency subbands and are distinguished by code sequences, comprising:
    generating a signal containing, for each data symbol, a sample at each subcarrier frequency and a set of extra samples that are not required for despreading or for use as a cyclic prefix for multipath channel equalization;
    windowing said signal with a transmitter window configured to support said extra samples for the purpose of interference excision in a receiver;
    transmitting said signal with said extra samples;
    receiving said signal with said extra samples;

exploiting said extra samples in order to mitigate effects of multiple-access interference in the presence of Doppler, wherein said exploiting includes sampling said signal at frequency intervals that are smaller than a spacing between subcarriers, and windowing said signal with a receiver window configured like said transmitter window to support said extra samples for interference excision;

combining windowed samples with weighting coefficients to provide a decision statistic with the effects of multiple-access interference mitigated; and determining the data symbols from a sequence of decision statistics.

14. The method of claim 13, wherein the transmitted signal has a subcarrier spectrum thereof shaped by a transmitter window and a corresponding windowing function is performed after receiving the transmitted signal.

* * * * *

UNITED STATES PATENT AND TRADEMARK OFFICE
CERTIFICATE OF CORRECTION

PATENT NO. : 7,751,509 B1  
APPLICATION NO. : 10/959900  
DATED : July 6, 2010  
INVENTOR(S) : James S. Lehnert It is certified that error appears in the above-identified patent and that said Letters Patent is hereby corrected as shown below:

In column 1, line 40, please change "(MM)" to --(MAI)--

In column 6, please delete equation (9) and replace with $$-- H_1(f) = \frac{1}{T_c} \sum_{k=-\infty}^{\infty} \int_{-\infty}^{\infty} e^{-j2\pi(f-k/T_c)\tau} \int_{-\infty}^{\infty} h_1(\alpha)\psi^*\left(\frac{\tau-\alpha}{T_c}\right) d\alpha d\tau \quad (9) \; --$$

In column 7, line 17, please change " $H_1^*(k/M\,N)G_1^*(k/M\,N;\,i)$ " to $$-- H_1^*(k/MN)G_1^*(k/MN;i) \; --$$

In column 7, line 35, please delete " $\{W_m^{(1)}\}_{j,k} = W\left((j-k+m/M)\frac{1}{N}\right)$ " and replace with (11)

$$-- r_m[k] = R\left(\frac{(Mk+m)}{MN}\right) \; --$$

In column 7, line 43, please change " $W_m^{(l)}$ " to -- $W_m^{(1)}$ --

In column 7, line 54, please change " $W_m^{(1)}$ " to -- $W_m^{(1)}$ --

In column 7, line 57, please change " $a_l$ " to -- $a_1$ --

In column 7, line 59, please change " $H_m^{(l)}$ " to -- $H_m^{(l)}$ --

In column 7, line 61, please change " $H_m^{(1)}$ " to -- $H_m^{(1)}$ --

In column 8, line 2, please change " $\rho_m = H_m^{(1)}W_m^{(1)}a_i$ " to -- $\rho_m = H_m^{(1)}W_m^{(1)}a_1$ --

In column 8, line 38, please change "$b_l s$" to -- $b_1 s$ --

Signed and Sealed this

Seventh Day of December, 2010

David J. Kappos  
*Director of the United States Patent and Trademark Office*

CERTIFICATE OF CORRECTION (continued)
U.S. Pat. No. 7,751,509 B1

In column 9, please delete equation (20) and replace with $$z_m[k] = Z\left(\frac{(Mk+m)}{MN}\right) \quad (20)$$

In column 10, line 16, please change " $\mathrm{W}_m^{(1)}$ " to -- $W_m^{(1)}$ --